US007200820B1

(12) United States Patent
Stephens

(10) Patent No.: US 7,200,820 B1
(45) Date of Patent: Apr. 3, 2007

(54) SYSTEM AND METHOD FOR VIEWING SEARCH RESULTS

(75) Inventor: Robert T. Stephens, Sharpsburg, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 593 days.

(21) Appl. No.: 10/256,127

(22) Filed: Sep. 27, 2002

(51) Int. Cl.
*G06F 3/00* (2006.01)
(52) U.S. Cl. ................ 715/838; 715/735; 713/155; 707/3
(58) Field of Classification Search .............. 715/846, 715/713, 838, 855, 735; 713/155; 707/3
See application file for complete search history.

(56) References Cited

U.S. PATENT DOCUMENTS

| 6,597,377 B1 * | 7/2003 | MacPhail ............... 715/738 |
| 6,864,904 B1 * | 3/2005 | Ran et al. .............. 715/760 |
| 2004/0002962 A1 * | 1/2004 | Banerjee et al. .......... 707/3 |
| 2004/0059720 A1 * | 3/2004 | Rodriguez .............. 707/3 |

OTHER PUBLICATIONS

J. Muthukumarasamy and J. Stasko, "Visualizing Program Executions on Large Data Sets Using Semantic Zooming," Technical Report GIT-GVU-95-02, Georgia Institute of Technology, Atlanta, GA 30332-0280; http://citeseer.nj.nec.com/cache/papers/cs/169/ftp:zSzz Szftp.cc.gatech.eduzSzpubzSzgvuzSztech-reportszSz95-02.pdf.

M. Czerwinski, M. Van Dantzich, G. Robertson and H. Hoffman, "The Contribution of Thumbnail Image, Mouse-over Text and Spatial Location Memory to Web Page Retrieval in 3D," Microsoft Research, One Microsoft Way, Redmond, WA; http://citeseer.nj.nec.com/cache/papers/cs/18831/http:zSzzSzwww.research.Microsoft.comzSzuserszSzmaryczzSzinteract99.pdf.

J. Bala, S. Baik and A. Hadjarian, "Inferring and Visualizing Classification Rules;" http://www1.math.uni-augsburg.de/Symposium/papers/bala.pdf.

D. Gougeon, "In Search of Web Usability;" www.CBD-HQ.com. "Dublin Core Qualifiers" dated Jul. 11, 2000; http://dublincore.org/documents/2000/07/11/dcmes-qualificers/.

T. Baker, "A Grammar of Dublin Core," D-Lib Magazine (Oct. 2000), vol. 6, No. 10; http://www.dlib.org/dlib/october00/baker/10baker.html.

"Dublin Core Metadata Initiative (DCMI) Frequently Asked Questions (FAQ);" http://dublincore.org/resources/faq/.

(Continued)

*Primary Examiner*—Raymond J. Bayerl
*Assistant Examiner*—Dennis G. Bonshock
(74) *Attorney, Agent, or Firm*—Withers + Keys, LLC

(57) ABSTRACT

A system and method for viewing search results is disclosed. A method of communicating a search result according to various views is disclosed. A method of displaying metadata associated with content of websites is disclosed. A method of displaying metadata associated with relationships of websites is disclosed. A method of displaying metadata associated with images of websites is disclosed. A method of displaying metadata associated with seals of websites is disclosed. A method of displaying metadata associated with one or more websites in a view, receiving a request to change the view, and displaying metadata associated with the one or more websites in a second view is disclosed.

10 Claims, 9 Drawing Sheets

OTHER PUBLICATIONS

T. Bray, "XML.com: What is RDF?"; http://www.xml.com/lpt/a/2001/01/24/rdf.html.

M. Cloyd, "Designing User-Centered Web Applications in Web Time," IEEE Software (Jan.-Feb. 2001, pp. 62-69).

S. Decker, P. Mitra and S. Melnik, "Framework for the Semantic Web: An RDF Tutorial," IEEE Internet Couputing (Nov.-Dec. 2000, pp. 68-73).

F. Nack, "All Content Counts: The Future in Digital Media Computing is Meta," IEEE Multimedia (Jul.-Sep. 2000, pp. 10-13).

O. Lassila, "Web Metadata: A Matter of Semantics," IEEE Internet Computing (Jul.-Aug. 1998, pp. 30-37).

T.N. Nigam, T.V. Prabhakar, "Platform Independent Tool for Designing Quality Graphical User Interfaces," Proceedings of the 3$^{rd}$ Basque International Workshop on Information Technology (BIWIT '97), pp. 54-61.

A. Woodruff, A. Faulring, R. Rosenholtz, J. Morrison and P. Pirolli, "Using Thumbnails to Search the Web," CHI 2001 (Mar. 31-Apr. 5, vol. No. 3, Issue No. 1); pp. 198-205.

K. Hornbæk and E. Frøkjær, Reading of Electronic Documents: The Usability of Linear, Fisheye, and Overview+Detail Interfaces, CHI 2001 (Mar. 31-Apr. 5, vol. No. 3, Issue No. 1); pp. 293-300.

N. Glance, "Community Search Assistant," Xerox Research Center Europe, 6 chemin de Maupertuis, 38240 Meylan, France (IUI'01, Jan. 14-17, 2001, Santa Fe, NM).

* cited by examiner

LIST VIEW (PRIOR ART)

Title: PhDSurvey: R. Todd Stephens Ph.D. Web Site for The Nova ...
Description: The default.htm page is the home page for PHdSurvey.com. ... This means that Phdsurvey.com is no longer needed and a new requirement has emerged. ...
URL/Size: www.phdsurvey.com/ - 26k – Cached – Similar pages Title: Washington Trust Trust Accounts
Description: ... If you do not have an access ID, or if you have forgotten it (or your PIN), please contact your Washington Trust Relationship Officer at 401-348-1238 or 1-800 ...
URL/Size: www.washtrust.com/trust/htm - 11k - Cached - Similar pages Title: Yahoo Groups : online-trust
Description: ... Welcome, Guest, --- online-trust – Online Trust, [ Join This Group! ]. ... The focus will be on understanding online trust, evaluating trust and designing for trust. ...
URL/Size: groups.yahoo.com/group/online-trust/ 16k – Cached – Similar pages

FIGURE 1

SYSTEM AND METHOD FOR VIEWING SEARCH RESULTS

BACKGROUND

1. Field of the Invention

The present invention relates to a system and method for viewing search results.

2. Background of the Invention

The quantity of information on the world wide web (the "Web") is staggering. And it increases every day. This vast sea of information provides a wealth of data to people willing to search for it. People must search for it because rarely do people know exactly the website that holds the data for which they are looking; most people instead know what kind of data for which they are looking, but not where it resides.

To aid people in their search for data, computer scientists implemented search engines. These search engines generally rely on keywords received from a user. To enter the right keywords, the user first thinks through the kind of data he is interested in and figures out what key words will likely be present in a website having such data (often with mixed success). A search engine, such as those used by Google™ or Altavista™, search many of the websites on the Web for these keywords.

For many keywords the user will receive thousands of websites. Thousands of websites are not useful. To reduce the number, users will typically hone their choice of keywords. After doing so, if the user is reasonably successful, the user will receive just hundreds of websites. Even if the user is fortunate enough to receive only fifty websites, the user must spend a lot of time manually verifying, one-by-one, each search result to see if it has the data in which he is interested.

Verifying search results is especially a problem because many current search engines present search results in views that are difficult for users to analyze. Most search engines display results in a view showing the Web address and a short piece of text containing the keywords (called a "description"), and in some cases a short summary of the website. These views can be difficult to analyze, in part because many users have no choice but to, manually and laboriously, verify that the website contains data in which he is interested by reading each Web address, the few words surrounding the keywords, and, in some cases, the short summary. Even with this effort, often users cannot accurately verify that the website is of interest without visiting the websites, further wasting their time.

SUMMARY OF THE INVENTION

The present invention is directed to a system and method for viewing search results. The present invention is also directed to viewing metadata of search results.

In an embodiment, a search engine displays an icon representing a website, a linked icon representing a linked website, and a symbol residing between the icon and the linked icon.

In another embodiment, a search engine displays a title of a website and metadata related to content associated with the website.

In another embodiment, a search engine displays a URL of a website and metadata related to images associated with the website.

In another embodiment, a search engine communicates a search result in a first view, receives a request to communicate the search result in a second view, and then communicates the search result in a second view.

Additional features and advantages of the invention will be set forth in the description that follows, and in part will be apparent from the description, or may be learned by practice of the invention. The objectives and advantages of the invention will be realized and attained by the structure and steps particularly pointed out in the written description, the claims, and the drawings.

BRIEF DESCRIPTION OF THE DRAWINGS

FIG. 1 is a schematic diagram of a prior art list view.

DETAILED DESCRIPTION OF THE INVENTION

Figure 2:
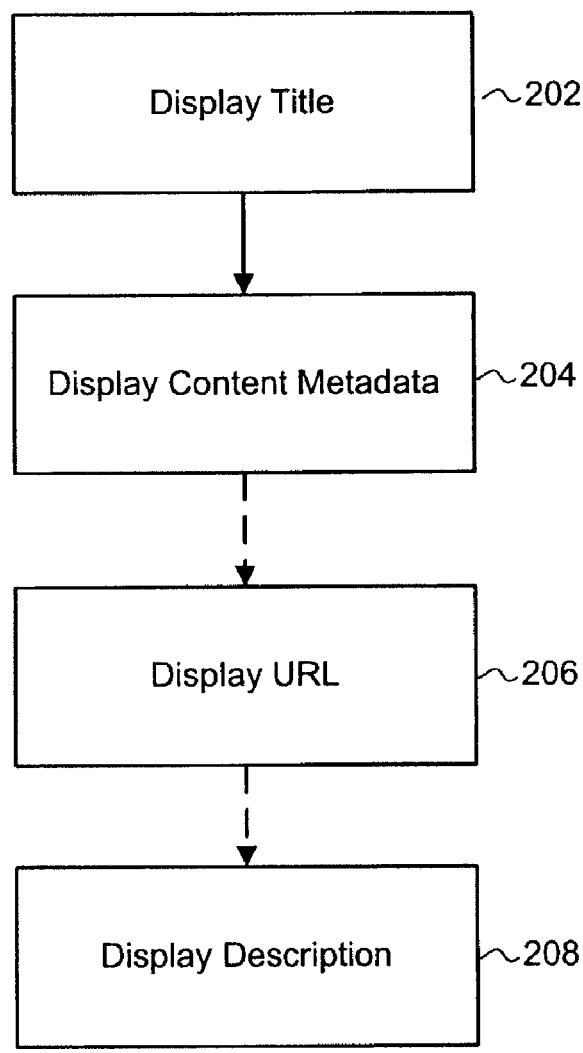
FIG. 2 is a flow diagram of a preferred embodiment of a method in accordance with the present invention.

The present invention includes a method for improving the understandability of search engine results. To do so, the present invention uses metadata. Metadata is data about data; it describes data. For example, data, such as a book in the library, e.g., Moby Dick, can be described as a novel; a work by Herman Melville; a work about whales and whalers; a work about relentless pursuit; and a work written in the $19^{th}$ Century, as well as many others. In this example, the data is the text of Moby Dick and the metadata is the description of Moby Dick: the author—Herman Melville; the subject—whales, whalers, and relentless pursuits; and the time written—the $19^{th}$ Century.

FIG. 1 is a schematic diagram showing a prior art example of a list view of search results of a search of a global network. A list view 102 sets forth in a list some of the metadata and data associated with each of three websites resulting from the search of the global network.

List view 102 contains, for each website, the website's title (a first title 104, a second title 110, and a third title 116), description (a first description 106, a second description 112, and a third description 118), URL ("Universal Resource Locator") and size (a first URL/size 108, a second URL/size 114 size, and a third URL/size 120), related information loaded into cache memory ("cached") (a first cache 122, a second cache 126, and a third cache 130), and similar pages (a first similar pages 124, a second similar pages 128, and a third similar pages 132).

This list of information for each website contains both metadata and data. In list view 102 the following are data: titles 104, 110, and 116; descriptions 106, 112, and 118; and similar pages 124, 128, and 132. This data is part of the text of the applicable website, which is not generally intended to describe the website—it is information typically viewed by a user when the user visits the website. Caches 122, 126, and 130 indicate information associated with a website that is stored in cache memory for easy and/or quick retrieval.

In list view 102, URL/Sizes 108, 114, and 120, are metadata. They describe the website. URLs are the address of the website and the size is the amount of memory typically needed to download the website.

As used herein, the term "website" means portions of a website or the entire website, as apparent given the context.

The present invention preferably is capable of presenting metadata contained in a search result in a view to aid users in understanding the search results.

FIG. 2 is a flow diagram of a preferred embodiment of a method in accordance with the present invention. Generally, this preferred method provides the method by which a search engine displays a search result from a search of a network according to a content view. The network can include an intranet, extranet, global communications network (such as the Web), and other communications networks. The search engine can include any system, program, or application capable of presenting or displaying search results.

The search engine can display a content view of the websites that are included within the search result in various manners. The search engine can arrange the content metadata and other data associated with a website in various orientations, prominence, and detail. For clarity, however, the below description uses the orientation, prominence, and detail as set forth in FIG. 3 as an example of one of the many possible ways for the search engine to arrange the content metadata and other data associated with a website.

Prior to a display title step 202, the search engine, or some other system searching the network, produces search results. Such search results preferably include content metadata and data for each website within the search results. Search results that do not include content metadata for each website within the search results can alter the method set forth in FIG. 2. Search results that do not include content metadata can alter the method set forth in FIG. 2 to the extent that such content metadata is not available to the search engine from another source other than the search results.

In display title step 202, the search engine displays a title associated with a website that is part of a search result. Preferably, the search engine displays a title above other metadata and data associated with a website. In an exemplary embodiment, the search engine displays a first title 304 and a second title 310 associated with a first website 372 and a second website 374, respectively.

In a display content metadata step 204, the search engine displays content metadata associated with a website. Preferably, a search engine displays content metadata including a number of pages (a first pages 316 and a second pages 348) and a number of images (a first images 318 and a second images 350). First and second pages 316 and 348 preferably include the number of typical computer screens needed to display the typically displayed text associated with first website 372 and second website 374, respectively. First and second images 318 and 350 preferably include the number of graphical objects or images within first website 372 and second website 374, respectively.

Figure 3:
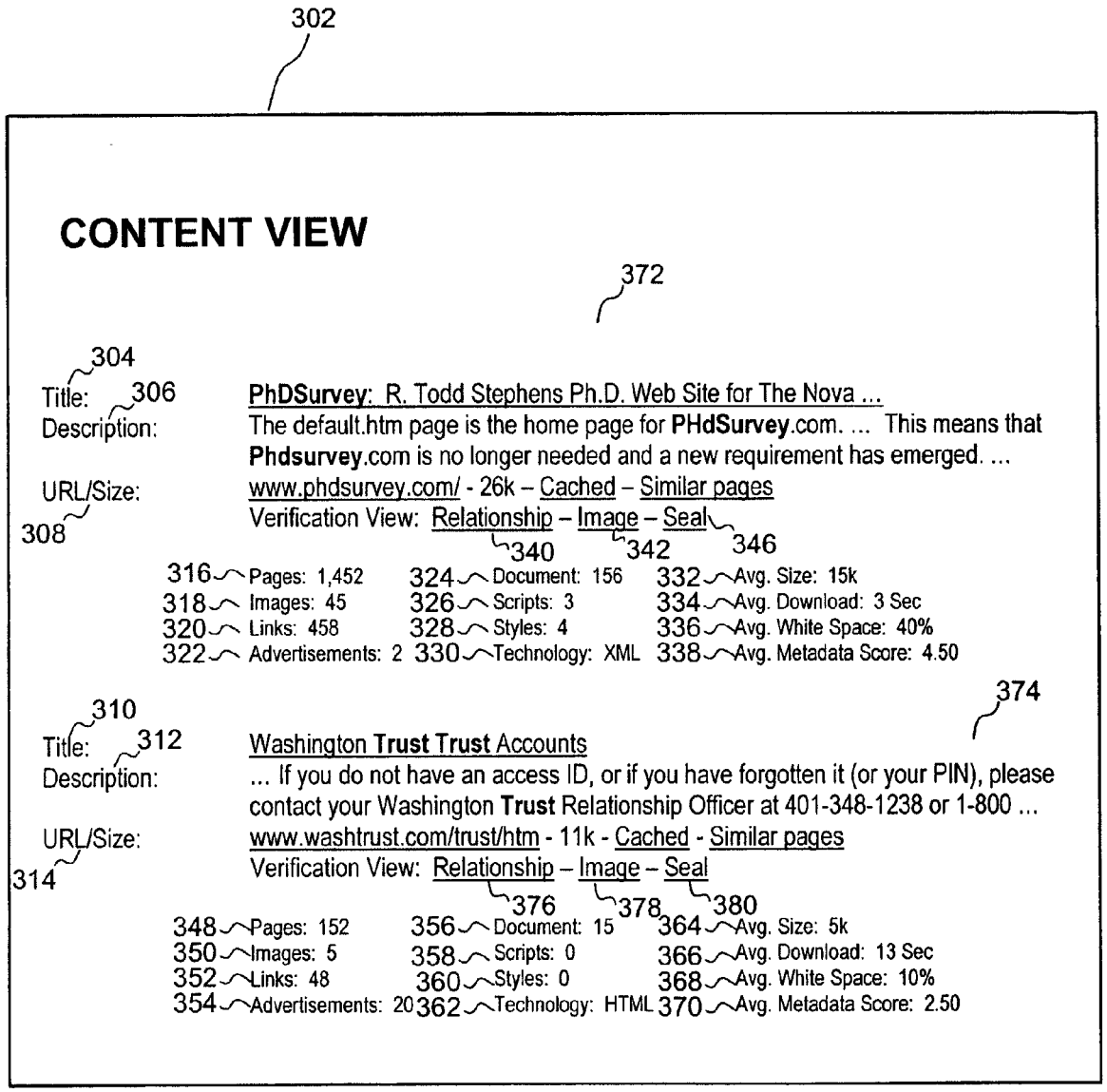
FIG. 3 is a schematic diagram of a preferred embodiment of a view in accordance with the present invention.

In an exemplary embodiment, a search engine displays, according to the orientation, prominence, and details shown in FIG. 3, first pages 316, first images 318, second pages 348, and second images 350 associated with first website 372 and second website 374, respectively.

Also in display content metadata step 204, preferably the search engine displays content metadata including a number of links (a first links 320 and a second links 352) and a number of advertisements (a first advertisements 322 and a second advertisements 354). First and second links 320 and 352 preferably include the number of links to other websites that are within first website 372 and second website 374, respectively. First and second advertisements 322 and 354 preferably include the number of advertisements, such as banner ads, within first and second website 372 and 374, respectively.

In an exemplary embodiment, a search engine displays, according to the orientation, prominence, and details shown in FIG. 3, first links 320, first advertisements 322, second links 352, and second advertisements 354 of first website 372 and second website 374, respectively.

Also in display content metadata step 204, preferably the search engine displays content metadata including a number of documents (a first documents 324 and a second documents 356). First and second documents 324 and 356 preferably include the number of documents that are within first and second websites 372 and 374, respectively. Preferably, documents can include content available through a web interface or as part of a website. Also preferably, documents can be or be delivered through any type of format, including HTML (Hyper Text Machine Language), Word™, and PDF (Portable Document Format), for example.

In an exemplary embodiment, a search engine displays, according to the orientation, prominence, and details shown in FIG. 3, first documents 324 and second documents 356 of first website 372 and second website 374, respectively.

Also in display content metadata step 204, preferably the search engine displays content metadata including a number of scripts (a first scripts 326 and a second scripts 358) and a number of styles (a first styles 328 and a second styles 360). First and second scripts 326 and 358 preferably include a number of programs that can be directly executed that are associated with first and second websites 372 and 374, respectively. First and second styles 328 and 360 preferably include the number of different styles (such as a particular "look and feel," a cascading style sheet, or use of particular fonts, text sizes, images, and page layouts) used within first and second websites 372 and 374, respectively.

In an exemplary embodiment, a search engine displays, according to the orientation, prominence, and details shown in FIG. 3, first scripts 326, first styles 328, second scripts 358, and second styles 360 of first website 372 and second website 374, respectively.

Also in display content metadata step 204, preferably the search engine displays content metadata associated with first website 372 and second website 374 including a type of technology (a first technology 330 and a second technology 362) used. First and second technology 330 and 362 include the language associated with programming first and second websites 372 and 374, respectively, such as XML or HTML.

In an exemplary embodiment, a search engine displays, according to the orientation, prominence, and details shown in FIG. 3, first technology 330 and second technology 362 of first website 372 and second website 374, respectively.

Also in display content metadata step 204, preferably the search engine displays content metadata including an average size of a website (such as a first average size 332 and a second average size 364). First and second average sizes 332 and 364 preferably indicate the quantity of memory needed to download first and second websites 372 and 374, respectively.

In an exemplary embodiment, a search engine displays, according to the orientation, prominence, and details shown in FIG. 3, first average size 332 and second average size 364 of first website 372 and second website 374, respectively.

Also in display content metadata step 204, preferably the search engine displays content metadata including an average amount of time required to download a website (a first average download 334 and a second average download 366). First and second average download 334 and 366 preferably indicate the amount of time it will take to download first and second websites 372 and 374, respectively, using a 56 Kbps modem.

In an exemplary embodiment, a search engine displays, according to the orientation, prominence, and details shown in FIG. 3, first average download 334 and second average download 366 of first website 372 and second website 374, respectively.

Also in display content metadata step 204, preferably the search engine displays content metadata including an average white space present (a first average white space 336 and a second average white space 368). First and second white space 336 and 368 represent the average amount of first website 372 and second website 374, respectively, that is not covered with text or other objects. As used herein, the term "white space" means an amount of an applicable website that is not covered with text or other objects.

In an exemplary embodiment, a search engine displays, according to the orientation, prominence, and details shown in FIG. 3, first average white space 336 and second average white space 368 of first website 372 and second website 374, respectively.

Also in display content metadata step 204, preferably the search engine displays content metadata including an average metadata score (a first average metadata score 338 and a second average metadata score 370). First and second average metadata scores 338 and 370 represent a score (preferably numerical) that is an average of the reliability and accuracy of various types of metadata associated with first website 372 and second website 374, respectively. As used herein, the term "average metadata score" represent a score (preferably numerical) that is an average of the reliability and accuracy of various types of metadata associated with an applicable website.

In an exemplary embodiment, a search engine displays, according to the orientation, prominence, and details shown in FIG. 3, first average metadata score 338 and second average metadata score 370 of first website 372 and second website 374, respectively.

FIG. 2 shows two steps, display title step 202 and display content metadata step 204 and two optional steps of a display URL step 206 and a display description step 208. In some embodiments, one or both of display URL step 206 and display description step 208 can be included.

In the optional step of display URL step 206, the search engine displays a URL associated with a website. Preferably this URL is the address of a website in which the search engine found results matching criteria requested by the user.

In an exemplary embodiment, a search engine displays, according to the orientation, prominence, and details shown in FIG. 3, a URL along with a size, a first URL/Size 308 and a second URL/Size 314 of first website 372 and second website 374, respectively. The size of first and second URL/Sizes 308 and 314 preferably includes the amount of memory typically needed to download first website 372 and second website 374, respectively.

FIG. 3 is a schematic diagram, portions of which set forth a preferred embodiment of the present invention. A content view 302 sets forth a view showing data and content metadata associated with each of two websites resulting from a search of a network.

Specifically, this embodiment shows a view displaying content metadata associated with two websites, first website 372 and second website 374. First website 372 and second website 374 are two websites included within a search result of a search of a network.

Content view 302, in part, sets forth for each website the website's title (first title 304 and second title 310), description (a first description 306 and a second description 312), and URL and size (first URL/size 308 and second URL/size 314). First title 304, second title 310, first description 306, and second description 312 are part of the text of first and second websites 372 and 374, respectively. First title 304, second title 310, first description 306, and second description 312 are data. In content view 302, first URL/Size 308 and second URL/Size 314 are metadata. First URL/Size 308 and second URL/Size 314 describe first website 372 and second website 374, respectively, including the addresses and sizes of first and second websites 372 and 374 ("size" is the amount of memory typically needed to download a website).

Content view 302 sets forth content metadata. Content metadata preferably includes metadata intended to describe the content of a website. In an exemplary embodiment, content metadata includes first website 372's number of pages (first pages 316), number of images (first images 318), number of links to other websites (first links 320), number of advertisements (first advertisements 322), number of documents (first documents 324), number of scripts (first scripts 326), number of styles (first styles 328), type of language or technology used to create and/or program first website 372 (first technology 330), average size (first average size 332), average download time with a 56 Kbps modem (first average download 334), average white space of pages (first average white space 336), and average metadata score (first average metadata score 338).

In another exemplary embodiment, content metadata includes second website 374's number of pages (second pages 348), number of images (second images 350), number of links to other websites (second links 352), number of advertisements (second advertisements 354), number of documents (second document 356), number of scripts (second scripts 358), number of styles (second styles 360), type of language or technology used to create and/or program second website 374 (second technology 362), average size (second average size 364), average download time with a 56 Kbps modem (second average download 366), average white space of pages (second average white space 368), and average metadata score (second average metadata score 370).

In another exemplary embodiment (not shown), content metadata includes metadata included within the scope of terms defined within the Dublin Core vocabulary. Dublin core terms preferably include: title; creator; subject; description; publisher; contributor; date; type; format; identifier; source; language; relation; coverage; and rights.

Content view 302 preferably includes some way for a user to move from content view 302 to another type of view. Preferably, content view 302 includes a link to a first relationship view (a first relationship link 340), a first image view (a first image link 342), and/or a first seal view (a first seal link 346) of first website 372. Also preferably, content view 302 includes a link to a second relationship view (a second relationship link 376), a second image view (a second image link 378), and/or a second seal view (a second seal link 380) of second website 374.

In an exemplary embodiment, links 340, 342, 346, 376, 378, and 380 direct the user to different views of multiple websites. In this exemplary embodiment, second relationship link 376, for instance, is configured to display a relationship view of second website 374 and first website 372.

Figure 4:
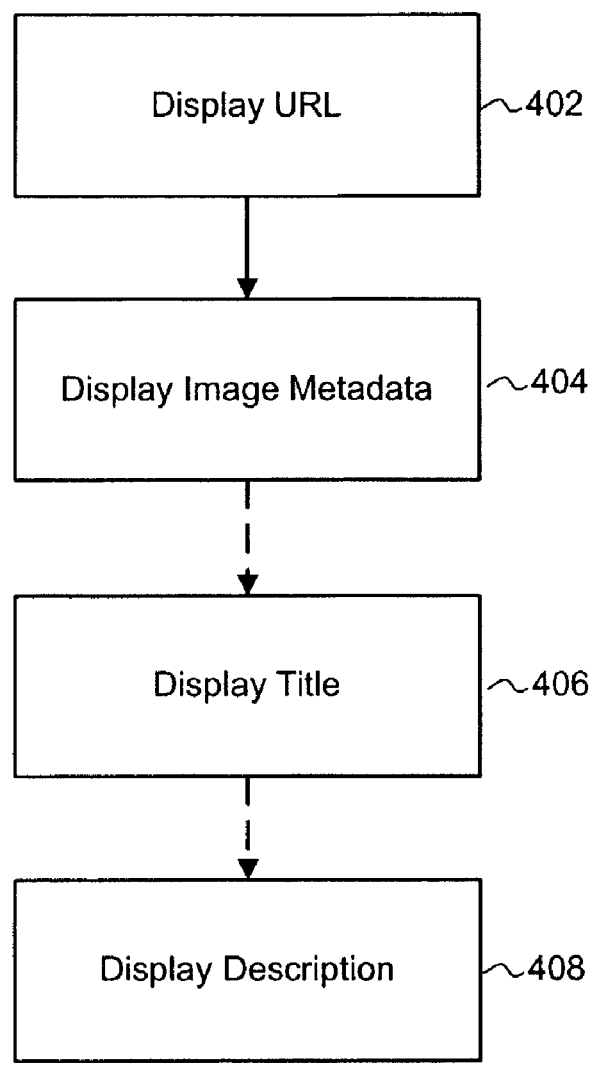
FIG. 4 is a flow diagram of a preferred embodiment of a method in accordance with the present invention.

FIG. 4 is a flow diagram of a preferred embodiment of a method in accordance with the present invention. Generally, this preferred method provides the method by which a search engine displays a search result from a search of a network according to an image view. The network can include an intranet, extranet, global communications network (such as the Web), and other communications network. The search engine can include any system, program, or application capable of presenting or displaying search results.

The search engine can display an image view of the websites that are included within the search result in various manners. The search engine can arrange the image metadata and other data associated with a website in various orientations, prominence, and detail. For clarity, however, the below description uses the orientation, prominence, and detail as set forth in FIGS. 5 and 6 as examples of two of the many possible ways for the search engine to arrange the image metadata and other data associated with a website.

Prior to a display URL step 402, the search engine (or some other system searching the network) and produces search results. Such search results preferably include image metadata and data for each website within the search results.

In display URL step 402, the search engine displays a URL associated with a website that is part of a search result. Preferably, the search engine displays a URL above other metadata associated with a website. In an exemplary embodiment, a search engine displays a first URL/Size 508 and a second URL/Size 514 associated with a first website 546 and a second website 548, respectively.

In a display image metadata step 404, the search engine displays image metadata associated with a website that is part of a search result. Preferably, the search engine displays image metadata associated with a website including a thumbnail of one or more pages of the website.

Figure 5:
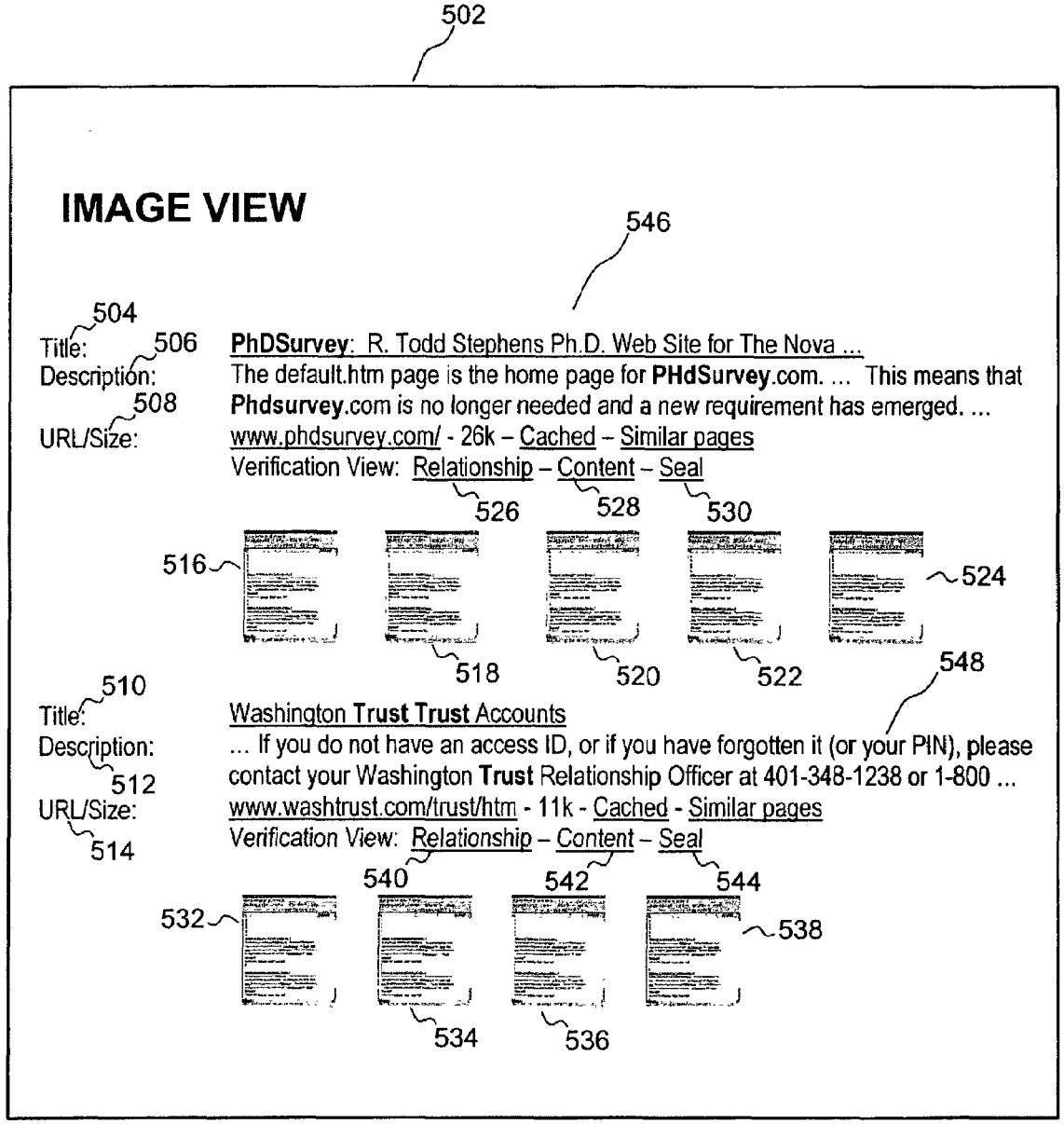
FIG. 5 is a schematic diagram of a preferred embodiment of a view in accordance with the present invention.

In an exemplary embodiment, a search engine displays, according to the orientation, prominence, and details shown in FIG. 5, a first thumbnail 516, a second thumbnail 518, a third thumbnail 520, a fourth thumbnail 522, and a fifth thumbnail 524 of first website 546, and a sixth thumbnail 532, a seventh thumbnail 534, an eighth thumbnail 536, and a ninth thumbnail 538 of second website 548.

In another embodiment of display image metadata step 404, a search engine displays image metadata associated with a website that is part of a search result. Preferably, a search engine displays image metadata associated with a website including a seal or trademark icon included within the website.

Figure 6:
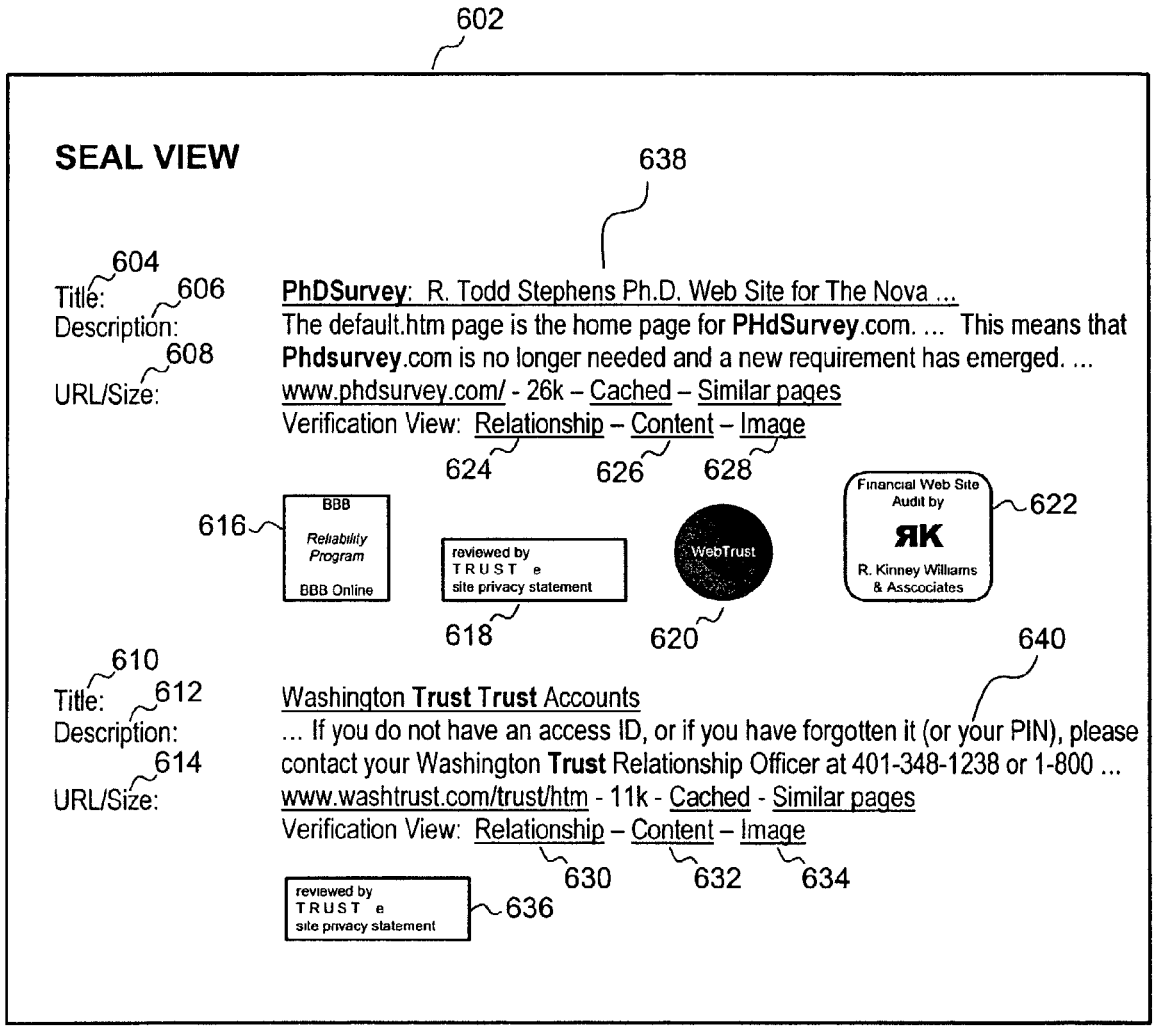
FIG. 6 is a schematic diagram of a preferred embodiment of a view in accordance with the present invention.

In an exemplary embodiment, a search engine displays, according to the orientation, prominence, and details shown in FIG. 6, a first seal 616, a second seal 618, a third seal 620, and a fourth seal 622 of a first website 638, and a fifth seal 636 of a second website 640.

FIG. 4 shows two steps, display URL step 402 and display image metadata step 404 and two optional steps of a display title step 406 and a display description step 408. In some embodiments, one or both of display title step 406 and display description step 408 can be included.

In the optional step of display title step 406, a search engine displays a title associated with a website. Preferably this title is the title of the page of the website in which the search engine found results matching criteria requested by a user.

In an exemplary embodiment, a search engine displays, according to the orientation, prominence, and details shown in FIGS. 5 and 6, a first title 504 of first website 546, a second title 510 of second website 548, a first title 604 of first website 638, and a second title 610 of second website 640.

FIG. 5 is a schematic diagram, portions of which set forth a preferred embodiment of the present invention. An image view 502 sets forth a view showing data and image metadata resulting from a search of a network.

Specifically, this embodiment shows a view displaying image metadata associated with two websites, first website 546 and second website 548. First website 546 and second website 548 are two websites included within a search result of a search of a network.

Image view 502, in part, sets forth for each of first and second website the website's title (first title 504 and second title 510), description (a first description 506 and a second description 512), a URL and size (first URL/size 508 and second URL/size 514). First title 504, second title 510, first description 506, and second description 512 are part of the text of websites. First title 504, second title 510, first description 506, and second description 512 are data.

In image view 502, first URL/Size 508 and second URL/Size 514 are metadata. They describe the website. First and second URL/sizes 508 and 514 include the addresses and sizes of first and second websites 546 and 548, respectively ("size" is the amount of memory typically needed to download a website).

Image view 502 sets forth image metadata. Image metadata preferably includes metadata showing images that look similar to pages, objects, or icons associated with a website. Preferably, image metadata includes images including thumbnail images of pages of a website.

In an exemplary embodiment, image view 502 sets forth first thumbnail 516, second thumbnail 518, third thumbnail 520, fourth thumbnail 522, and fifth thumbnail 524 of first website 546, and sixth thumbnail 532, seventh thumbnail 534, eighth thumbnail 536, and ninth thumbnail 538 of second website 548. In this exemplary embodiment, each of thumbnails 516, 518, 520, 522, 524, 532, 534, 536, and 538 represent a small image of a page in a website where one or more search terms of a network search are found or associated. Thus, a user can, by looking at thumbnails 516, 518, 520, 522, and 524, determine additional information about the data within first website 546. This additional information can make a user's analysis of website 546, or other websites in a search result, easier and more complete.

If a user is looking for pictures of miniature poodles, for instance, and so searches a network, such as the world wide web, using search terms like "poodle miniature picture", for instance, a search result may produce hundreds of websites, many of which will not contain pictures. In this example, the user could quickly review thumbnails 518, 520, 522, 524, 532, 534, 536, and 538 to determine if either first or second website 546 or 548 contain pictures.

Image view 502 preferably includes some way for a user to move from image view 502 to another type of view. Preferably, image view 502 includes a link to a first relationship view (a first relationship link 526), a first content view (a first content link 528), and/or a first seal view (a first seal link 530) of first website 546. Also preferably, image view 502 includes a link to a second relationship view (a second relationship link 540), a second content view (a second content link 542), and/or a second seal view (a second seal link 544) of second website 548.

In an exemplary embodiment, links 526, 528, 530, 540, 542, and 544 direct the user to different views of multiple websites. In this exemplary embodiment, second relationship link 540, for instance, is configured to display a relationship view of second website 548 and first website 546.

FIG. 6 is a schematic diagram, portions of which set forth a preferred embodiment of the present invention. A seal view 602 sets forth a view showing data and image metadata resulting from a search of a network.

Specifically, this embodiment shows a view displaying image metadata associated with two websites, first website 638 and second website 640. First website 638 and second website 640 are two websites included within a search result of a search of a network.

Seal view 602, in part, sets forth, respectively, for each of first and second websites 638 and 640's a title (first title 604 and second title 610), a description (a first description 606 and a second description 612), a URL and size (a first URL/size 608 and a second URL/size 614). First title 604, second title 610, first description 606, and second description 612 are part of the text of first and second website 638 and website 640 (respectively); they do not describe the website they are pieces of data from within the websites. First title 604, second title 610, first description 606, and second description 612 are data.

In seal view 602, first URL/Size 608 and second URL/Size 614 are metadata. They describe first and second websites 638 and website 640, respectively. A URL includes the address of a website and a size is the amount of memory typically needed to download a website.

Seal view 602 sets forth image metadata. Image metadata preferably includes metadata showing seals that look similar to seals associated with a website. Preferably, image metadata includes seals that are symbols that represent entities related to a website. Also preferably, seals can include graphical objects and other non-basic-text contained within a website.

In an exemplary embodiment, seal view 602 sets forth first seal 616, second seal 618, third seal 620, and fourth seal 622 of first website 638, and fifth seal 636 of second website 640. In this exemplary embodiment, each of seals 616, 618, 620, and 622 represent an image representing a seal image associated with first website 638 and (and fifth seal 636 associated with second website 640). Thus, a user can, by looking at seals 616, 618, 620, and 622 determine additional information about the data within first website 638. This additional information can make a user's analysis of first website 638, or other websites in a search result, easier and more complete.

If a user is looking for a safe place to buy an electric fence for his miniature poodle, for instance, and so searches a network, such as the world wide web, using search terms "electric fence sales", a search result may include hundreds of websites, many of which will not be for websites selling electric fences or be approved by various watchdog associations. In this example, the user could quickly review seal 616 to determine that first website 638 likely is a website for a business (and also a business that is approved by the Better Business Bureau), and seal 618 and 620 to determine that the owner of first website 638 is approved of by TRUSTe™ and WebTrust™, and therefore is likely to be a reputable business.

Seal view 602 preferably includes some way for a user to move from seal view 602 to another type of view. Preferably, seal view 602 includes a link to a first relationship view (a first relationship link 624), a first content view (a first content link 626), and/or a first image view (a first image link 628) of first website 638. Also preferably, seal view 602 includes a link to a second relationship view (a second relationship link 630), a second content view (a second content link 632), and/or a second image view (a second image link 634) of second website 640.

In an exemplary embodiment, links 624, 626, 628, 630, 632, and 634 direct the user to different views of multiple websites. In this exemplary embodiment, first content view 626, for instance, is configured to display a content view of first website 638 and second website 640.

Figure 7:
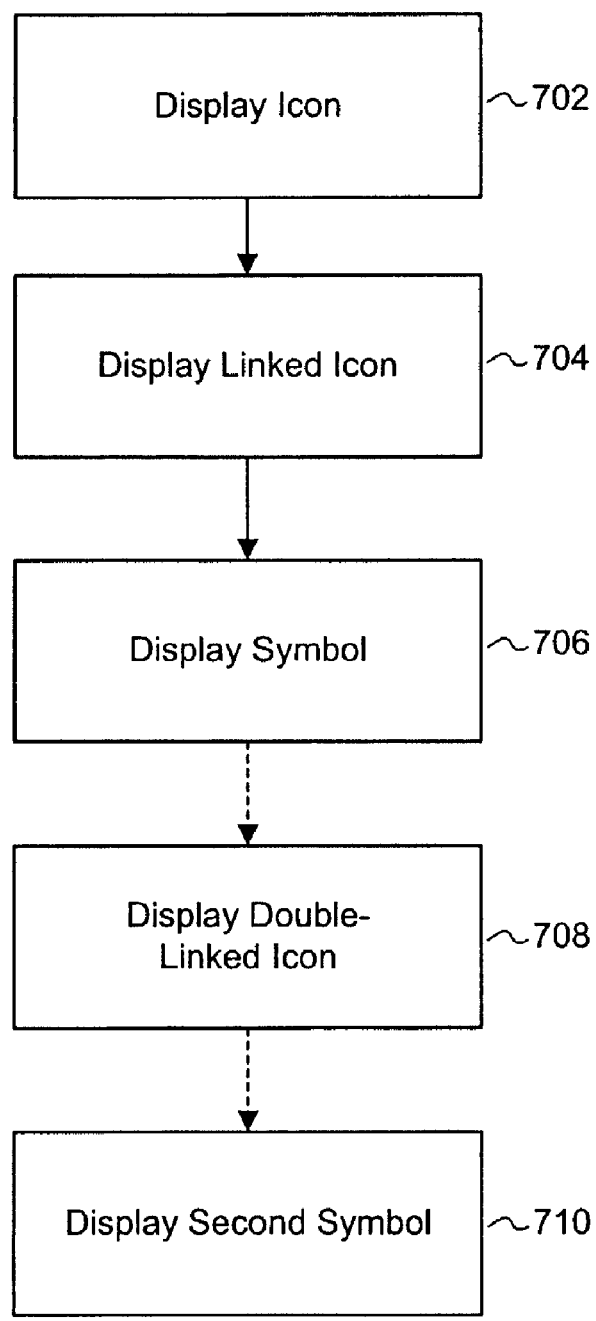
FIG. 7 is a flow diagram of a preferred embodiment of a method in accordance with the present invention.

FIG. 7 is a flow diagram of a preferred embodiment of a method in accordance with the present invention. Generally, this preferred method provides a method by which a search engine displays a search result from a search of a network according to an relationship view. The network can include an intranet, extranet, global communications network (such as the Web), and other communications network. The search engine can include any system, program, or application capable of presenting or displaying search results.

The search engine can display a relationship view of the websites that are included within the search result in various manners. The search engine can arrange the relationship metadata in various orientations, prominence, and detail. For clarity, however, the below description uses the orientation, prominence, and detail as set forth in FIG. 8 as an example of one of the many possible ways for the search engine to arrange the relationship metadata associated with a website.

Prior to a display icon step 702, a search engine (or some other system) searches the network and produces search results. Such search results preferably include relationship metadata for each website within the search results.

In display icon step 702, the search engine displays an icon representing a website that is part of a search result (a "result-website"). Preferably, the search engine displays the icon such that from one direction there is sufficient area in the relationship view to display other icons and symbols. In an exemplary embodiment, the search engine displays an icon 804 associated with the result-website.

In a display linked icon step 704, the search engine displays relationship metadata associated with a result-website. Preferably, the search engine displays relationship metadata associated with a result-website including a linked icon representing a website having a link within or otherwise associated with the result-website (a "linked-website").

Figure 8:
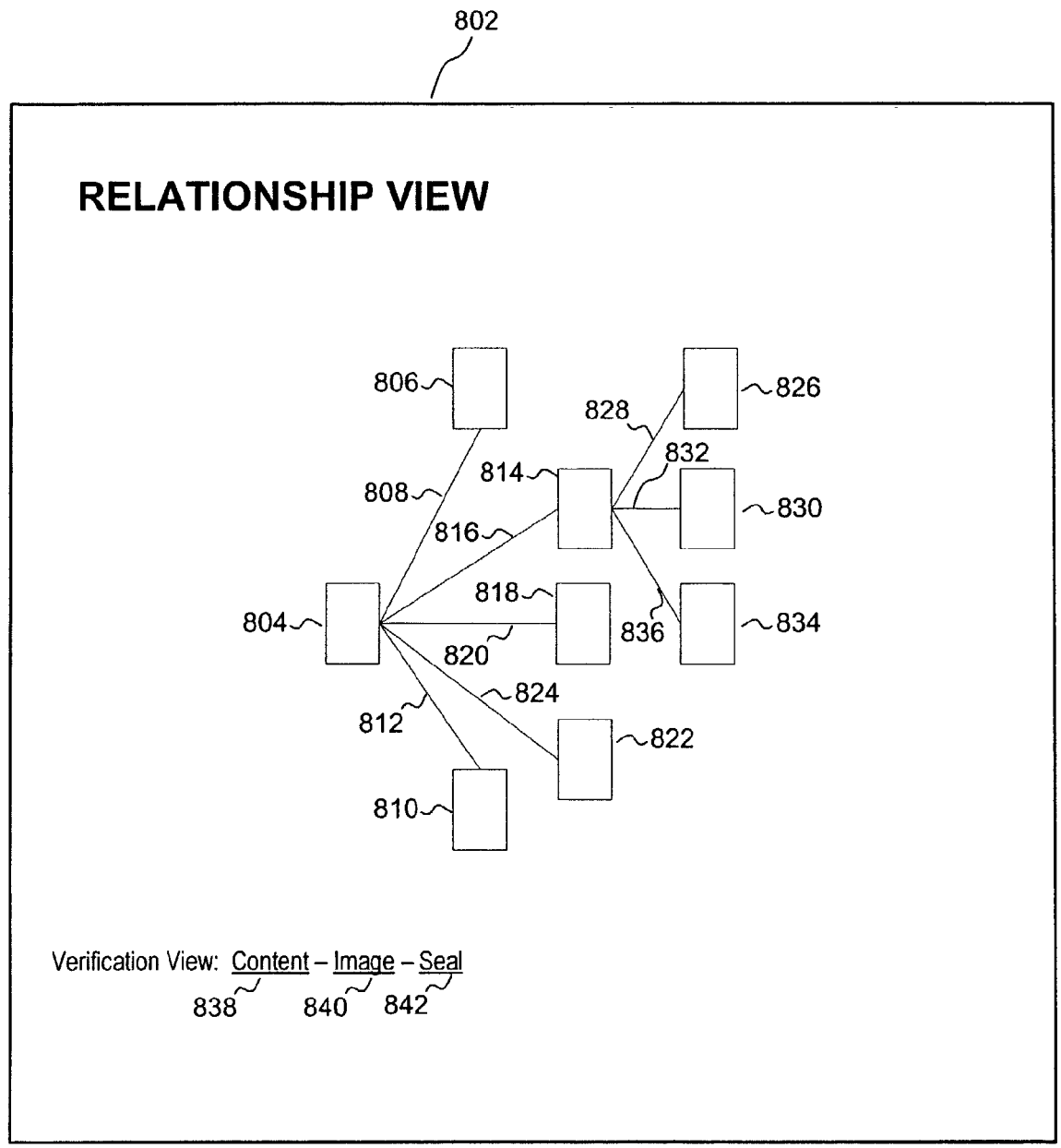
FIG. 8 is a schematic diagram of a preferred embodiment of a view in accordance with the present invention.

In an exemplary embodiment, the search engine displays, according to the orientation, prominence, and details shown in FIG. 8, a first linked icon 806, a second linked icon 814, a third linked icon 818, a fourth linked icon 822, and a fifth linked icon 810. Each of linked icons 814, 818, 822, and 810 preferably represent a linked-website of the result-website (shown by icon 804).

Preferably, linked icons 806, 814, 818, 822, and 810 and icon 804 include text or graphics indicating the name, type, or other information regarding the applicable linked-website or result-website.

In an exemplary embodiment (not shown), linked icons 806, 814, 818, 822, and 810 and/or icon 804 include a title of the website.

In another exemplary embodiment (not shown), linked icons 806, 814, 818, 822, and 810 and/or icon 804 include a thumbnail of a page (such as a home page) associated with the website.

In a display symbol step 706, the search engine displays relationship metadata associated with a result-website. Also preferably, the search engine displays a symbol between an icon and one or more linked icons, where the icon represents the result-website, the linked icons represent linked websites, and the symbol represents a linkage and/or relationship between the result-website and the linked websites.

In an exemplary embodiment, a search engine displays, according to the orientation, prominence, and details shown in FIG. 8, a first symbol 808 between first linked icon 806 and icon 804, a second symbol 816 between second linked icon 814 and icon 804, a third symbol 820 between third linked icon 818 and icon 804, a fourth symbol 824 between fourth linked icon 822 and icon 804, and a fifth symbol 812 between lined icon 810 and icon 804.

In another exemplary embodiment, symbols 808, 816, 820, 824, and 812 include a line.

FIG. 7 shows three steps, display icon step 702, display linked icon step 704, display symbol step 706, and two optional steps of a display double-linked icon step 708 and a display second symbol step 710. In some embodiments, both of display double-linked icon step 708 and display second symbol step 710 can be included.

In display double-linked icon step 708, the search engine displays relationship metadata associated with a result-website and a linked-website. Preferably, the search engine displays relationship metadata associated with a linked-website including a double-linked icon representing a website having a link within or relationship with the linked-website (a "double-linked website").

In an exemplary embodiment, a search engine displays, according to the orientation, prominence, and details shown in FIG. 8, a first double-linked icon 826, a second double-linked icon 830, and a third double-linked icon 834. Each of double-linked icons 826, 830, and 834 preferably represent a double-linked website of a linked-website (shown by second linked-icon 814).

Preferably, double-linked icons 826, 830, and 834 and second linked-icon 814 include text or graphics indicating the name, type, or other information regarding the applicable double-linked website or linked-website.

In an exemplary embodiment (not shown), double-linked icons 826, 830, and 834 and second linked-icon 814 include a title of the applicable website.

In another exemplary embodiment (not shown), double-linked icons 826, 830, and 834 and second linked-icon 814 include a thumbnail of a page within the applicable website.

In display second symbol step 710, the search engine displays relationship metadata associated with a result-website and linked-website. Preferably, a search engine displays a symbol between a linked-icon and one or more double-linked icons, where the linked-icon represents the linked-website and the double-linked icons represent double-linked websites and the symbol represents a linkage and/or relationship between the linked-website and the double-linked websites.

In an exemplary embodiment, a search engine displays, according to the orientation, prominence, and details shown in FIG. 8, a first second-symbol 828 between double-linked icon 826 and second linked-icon 814, a second second-symbol 832 between double-linked icon 830 and second linked-icon 814, and a third second-symbol 836 between third double-linked icon 834 and second linked-icon 814.

In another exemplary embodiment, second-symbols 828, 832, and 836 include a line.

FIG. 8 is a schematic diagram, portions of which set forth a preferred embodiment of the present invention. A relationship view 802 sets forth a view showing relationship metadata resulting from a search of a network. The network can include an intranet, extranet, global communications network (such as the Web), and other communications network. The search can be performed by a search engine. The search engine can include any system, program, or application capable of presenting or displaying search results.

Relationship metadata includes websites that are related to the website resulting from the search. In a preferred embodiment, a website is related to another website when one or the other of the websites have a link to the other website. In another preferred embodiment, a website is related to another website because information within or related to the website indicates that another website is related to the website.

Specifically, this embodiment shows a view displaying relationship metadata associated with second website 374 of FIG. 3.

FIG. 8 sets forth icon 804, first linked icon 806, second linked icon 814, third linked icon 818, fourth linked icon 822, and fifth linked icon 810. Icon 804 represents a result-website resulting from a search. Each of linked icons 814, 818, 822, and 810 preferably represents a website having a link in or other relationship with a result-website (shown by icon 804).

The relationship of the linked-websites to the result-website (represented by linked icons 814, 818, 822, and 810 and icon 804) can be represented by a symbol, preferably residing between icon 804 and linked icons 814, 818, 822, and 810. In an exemplary embodiment, a relationship is represented by first symbol 808 between first linked icon 806 and icon 804, second symbol 816 between second linked icon 814 and icon 804, third symbol 820 between third linked icon 818 and icon 804, fourth symbol 824 between fourth linked icon 822 and icon 804, and fifth symbol 812 between fifth linked icon 810 and icon 804. In another exemplary embodiment, symbols 808, 816, 820, 824, and 812 include a line.

Preferably, linked icons 806, 814, 818, 822, and 810 and icon 804 include text or graphics indicating the name, type, or other information regarding the applicable linked-website or result-website.

In an exemplary embodiment (not shown), linked icons 806, 814, 818, 822, and 810 and/or icon 804 include a title of the website.

In another exemplary embodiment (not shown), linked icons 806, 814, 818, 822, and 810 and/or icon 804 include a thumbnail of a page (such as a home page) within the result-website.

If a linked-website includes a link to, or has some other relationship with, another website (called a double-linked website), this relationship preferably is represented by a second-symbol. Also preferably, this second-symbol is situated between a linked icon and a double-linked icon.

In an exemplary embodiment set forth in FIG. 8, relationship view 802 includes first double-linked icon 826, second double-linked icon 830, and third double-linked icon 834. Each of double-linked icons 826, 830, and 834 preferably represent a double-linked website having a link within or other relationship with a linked-website (shown by second linked-icon 814).

In an exemplary embodiment set forth in FIG. 8, relationship view 802 includes first second-symbol 828 between first double-linked icon 826 and second linked-icon 814, second second-symbol 832 between second double-linked icon 830 and second linked-icon 814, and third second-symbol 836 between third double-linked icon 834 and second linked-icon 814.

In another exemplary embodiment, second-symbols 828, 832, and 836 include a line.

Preferably, double-linked icons 826, 830, and 834 and second linked-icon 814 include text or graphics indicating the name, type, or other information regarding the applicable double-linked website or linked-website.

In an exemplary embodiment (not shown), double-linked icons 826, 830, and 834 include a title of the applicable double-linked website.

In another exemplary embodiment (not shown), double-linked icons 826, 830, and 834 includes a thumbnail of a page within the applicable double-linked website.

Preferably, relationship view 802 includes some way for a user to move from relationship view 802 to another type of view. In an exemplary embodiment set forth in FIG. 8, relationship view 802 includes a link to view the content of second website 374 (a content link 838), images of second website 374 (an image link 840), and/or images including seals of second website 374 (a seal view 842).

Figure 9:
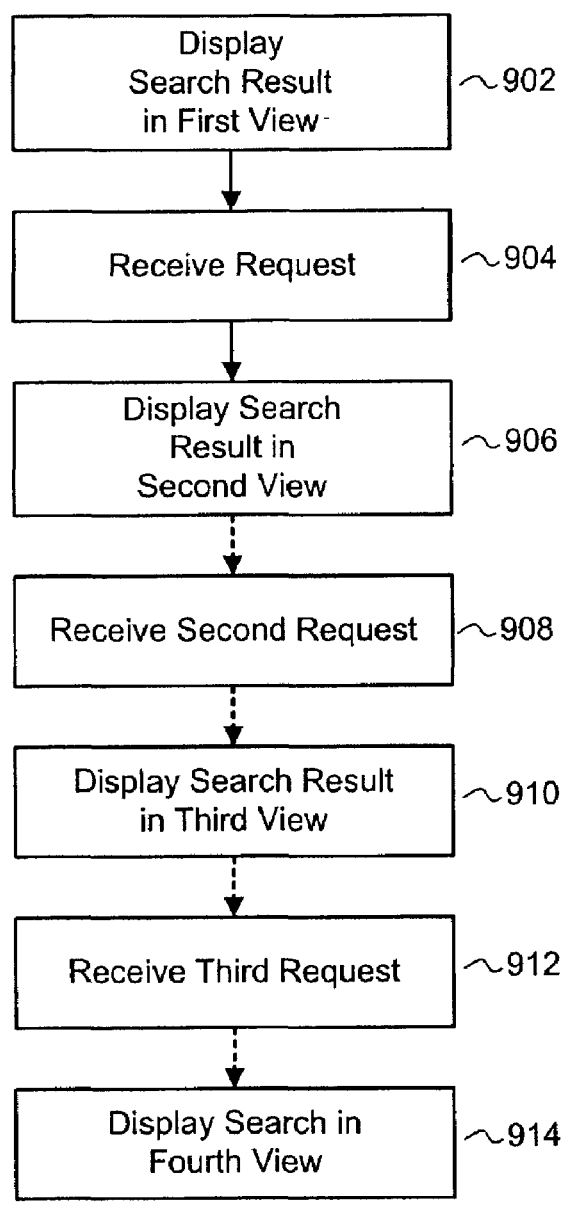
FIG. 9 is a flow diagram of a preferred embodiment of a method in accordance with the present invention.

FIG. 9 is a flow diagram of a preferred embodiment of a method in accordance with the present invention. Generally, this preferred method provides a method by which a search engine displays a search result from a search of a network according to a plurality of views. The network can include an intranet, extranet, global communications network (such as the Web), and other communications network. The search engine can include any system, program, or application capable of presenting or displaying search results.

The search engine can display a search result according to a plurality of views so that a user can view various aspects of websites. The search engine can arrange the data and metadata associated with the search result in various orientations, prominence, and detail. For clarity, however, the below description uses the orientation, prominence, and detail as set forth in FIGS. 1, 3, 5, 6, and 8 as examples of the many possible ways for a search engine to arrange data and metadata associated with a search result.

Prior to a display search result in first view step 902, a search engine (or some other system) searches a network and produces search results. Such search results preferably include image, content, and relationship metadata for each website within the search results.

In display search result in first view step 902, a search engine displays the search result in a first view. This first view can include any view of the results. Preferably this first view provides the user with basic data associated with websites from the results, such as a title, description, and URL associated with each website. In an exemplary embodiment, the first view includes list view 102 of FIG. 1.

The first view preferably includes some way for a user to request to display another type of view (which may or may not replace the first view). In an exemplary embodiment, the first view includes a link to view the content, images (including seals), and relationship of one or more of the websites associated with the search result.

In a receive request step 904, a search engine receives a request from a user requesting a view different from the first view. This request can be received in many different manners apparent to one skilled in the art. Preferably, it can be received through links associated with a type of view.

In an exemplary embodiment, a request can be received by a search engine through links to a type of view through first and second relationship links 340 and 376, first and second image links 342 and 378, and first and second seal links 346 and 380 of FIG. 3; first and second relationship links 526 and 540, first and second content links 528 and 542, and first and second seal links 530 and 544 of FIG. 5; first and second relationship links 624 and 630, first and second content links 626 and 632, and first and second image links 628 and 634 of FIG. 6; and content link 838, image link 840, and seal link 842 of FIG. 8.

After receiving a request, the search engine displays the search results according to a second view (a display search result in second view step 906). The second view can include any view of the results that in any way differ from the first view. Preferably, the second view provides the user with metadata regarding content of one or more websites associated with the results. In an exemplary embodiment, the second view includes content view 302 of FIG. 3.

The second view preferably includes some way for a user to request to display another type of view (which may or may not replace the second view). In an exemplary embodiment, the second view includes a link to view the images (including seals) and relationship of one or more of the websites associated with the search result.

FIG. 9 shows three steps, display search result in first view step 902, receive request step 904, display search result in second view step 906, and four optional steps of a receive second request step 908, a display search result in third view step 910, a receive third request step 912, and a display search in fourth view step 914. In some embodiments, steps 908 and 910 can be included. In some embodiment, steps 908, 910, 912, and 914 can be included.

In optional receive second request step 908, a search engine receives a second request from a user requesting a view different from the second view. This request can be received in many different manners apparent to one skilled in the art. Preferably, it can be received through links associated with a type of view.

In an exemplary embodiment, a request can be received by a search engine through links to a type of view through first and second relationship links 340 and 376, first and second image links 342 and 378, and first and second seal links 346 and 380 of FIG. 3; first and second relationship links 526 and 540, first and second content links 528 and 542, and first and second seal links 530 and 544 of FIG. 5; first and second relationship links 624 and 630, first and second content links 626 and 632, and first and second image links 628 and 634 of FIG. 6; and content link 838, image link 840, and seal link 842 of FIG. 8.

After receiving a request, the search engine displays the search results according to a third view (display search result in third view step 910). The third view can include any view of the results that in any way differ from the second view. Preferably, the third view provides the user with metadata different from the first view and the second view. Also preferably, the third view provides metadata regarding images related to one or more websites associated with the results. In an exemplary embodiment, the third view includes image view 502 of FIG. 5.

The third view preferably includes some way for a user to request to display another type of view (which may or may not replace the third view). In an exemplary embodiment, the third view includes a link to view the seals and relationships of one or more of the websites associated with the search result.

In optional receive third request step 912, a search engine receives a third request from a user requesting a view different from the third view. This request can be received in many different manners apparent to one skilled in the art. Preferably, it can be received through links associated with a type of view.

In an exemplary embodiment, a request can be received by a search engine through links to a type of view through first and second relationship links 340 and 376, first and second image links 342 and 378, and first and second seal links 346 and 380 of FIG. 3; first and second relationship links 526 and 540, first and second content links 528 and 542, and first and second seal links 530 and 544 of FIG. 5; first and second relationship links 624 and 630, first and second content links 626 and 632, and first and second image links 628 and 634 of FIG. 6; and content link 838, image link 840, and seal link 842 of FIG. 8.

After receiving a request, the search engine displays the search results according to a fourth view (display search result in fourth view step 914). The fourth view can include any view of the results that in any way differ from the third view. Preferably, the fourth view provides the user with metadata different from the first view, second view, and third view. Also preferably, the fourth view provides metadata regarding images, such as seals, related to one or more websites associated with the results. In an exemplary embodiment, the fourth view includes seal view 602 of FIG. 6.

Also preferably, the fourth view provides metadata regarding related websites associated with one or more websites associated with the results. In an exemplary embodiment, the fourth view includes relationship view 802 of FIG. 8.

The fourth view preferably includes some way for a user to request to display another type of view (which may or may not replace the fourth view). In an exemplary embodiment, the fourth view includes a link to view the seals or relationships of one or more of the websites associated with the search result.

In some embodiments, first view, second, view, third view, and fourth view can include any of the following types of views: image view 502, seal view 602, relationship view 802, content view 302, and list view 102.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of displaying search results comprising:
   displaying, in an image view, an icon representing a website included in the search results, wherein the icon includes a thumbnail of an actual page of the website;
   displaying a linked icon representing a linked website, wherein the linked website is part of the website;
   displaying a symbol representing a relationship, wherein the symbol resides between the icon and the linked icon; and
   displaying image metadata in a seal view, the image metadata comprising at least one seal, the at least one seal representing an entity related to the website, wherein the at least one seal is utilized to determine additional information about the website, the additional information including an entity type for the website and an approval designation for the website, wherein the approval designation is provided by the entity related to the website; and
   in response to a user input, switching from the image view to the seal view within the displayed search results.

2. The method of claim 1, wherein the symbol representing the relationship includes a line.

3. The method of claim 1, wherein the icon includes a title of the website.

4. The method of claim 1, wherein the linked icon includes a thumbnail of a page of the linked website.

5. The method of claim 1, wherein the linked icon includes a title of the linked website.

6. The method of claim 1, further comprising:
   displaying a second linked icon representing a second linked website, wherein the second linked website is part of the website; and
   displaying a second symbol representing a second relationship, wherein the second symbol resides between the icon and the second linked icon.

7. The method of claim 1, further comprising displaying a double-linked icon representing a double-linked website, wherein the double-linked website is part of the linked website.

8. The method of claim 7, further comprising displaying a second symbol representing a second relationship, wherein the second symbol resides between the linked icon and the double-linked icon.

9. The method of claim 1, further comprising:
   displaying a plurality of double-linked icons representing double-linked websites, wherein the double-linked websites are part of the linked website; and
   displaying a plurality of symbols representing a plurality of second relationships, wherein the plurality of second symbols resides between the linked icon and the double linked icons.

10. A computer readable medium containing instructions that when executed by a computer perform the acts of:
    displaying, in an image view, an icon representing a website included in search results, wherein the icon includes a thumbnail of an actual page of the web site;
    displaying a linked icon representing a linked website, wherein the linked website is part of the website;
    displaying a symbol representing a relationship, wherein the symbol resides between the icon and the linked icon;
    displaying image metadata in a seal view, the image metadata comprising at least one seal, the at least one seal representing an entity related to the website, wherein the at least one seal is utilized to determine additional information about the website, the additional information including an entity type for the website and an approval designation for the website, wherein the approval designation is provided by the entity related to the website; and
    in response to a user input, switching from the image view to the seal view within the displayed search results.

* * * * *